United States Patent
Lin (10) Patent No.: US 7,568,560 B2
(45) Date of Patent: Aug. 4, 2009

(54) CENTER MOUNT TWO PIECE BRAKE ROTOR

(76) Inventor: Warren Lin, 14 Daro Ct., Mountville, NJ (US) 07045

( * ) Notice: Subject to any disclaimer, the term of this patent is extended or adjusted under 35 U.S.C. 154(b) by 59 days.

(21) Appl. No.: 10/861,213

(22) Filed: Jun. 3, 2004

(65) Prior Publication Data

US 2005/0269174 A1  Dec. 8, 2005

(51) Int. Cl.
*F16D 65/10* (2006.01)

(52) U.S. Cl. ................................. 188/218 XL

(58) Field of Classification Search ............... 188/18 A, 188/218 XL, 264 AA
See application file for complete search history.

(56) References Cited

U.S. PATENT DOCUMENTS

| 2,745,518 | A | * | 5/1956 | Bachman | ............ | 188/218 XL |
|---|---|---|---|---|---|---|
| 3,985,391 | A | | 10/1976 | Hoffman et al. | | |
| 4,102,443 | A | | 7/1978 | Kohler et al. | | |
| 4,501,346 | A | * | 2/1985 | Bogenschutz | .......... | 188/218 XL |
| 5,544,726 | A | * | 8/1996 | Topouzian et al. | ...... | 188/264 A |
| 6,053,290 | A | * | 4/2000 | Goddard | .................. | 73/861.73 |
| 6,076,896 | A | * | 6/2000 | Bertetti et al. | ........... | 301/105.1 |
| 6,116,386 | A | | 9/2000 | Martin | | |
| 6,386,340 | B1 | | 5/2002 | Milesi et al. | | |
| 6,564,913 | B2 | | 5/2003 | Baumgartner et al. | | |
| 6,578,676 | B1 | | 6/2003 | Lin | | |
| 6,604,613 | B2 | | 8/2003 | Burgoon et al. | | |
| 6,626,273 | B1 | | 9/2003 | Baumgartner et al. | | |
| 2002/0157908 | A1 | * | 10/2002 | Burgoon et al. | ....... | 188/218 XL |
| 2003/0034213 | A1 | * | 2/2003 | Qian et al. | ............ | 188/218 XL |
| 2004/0084261 | A1 | * | 5/2004 | Burgoon et al. | ....... | 188/218 XL |

* cited by examiner

*Primary Examiner*—Bradley T King
(74) *Attorney, Agent, or Firm*—Michael I. Kroll (57) ABSTRACT

Embodiments of the present invention are directed to disc brake rotor assemblies which include disc brake rotor ring and a disc brake rotor hat. The disc brake rotor ring may include a first side including an inner perimeter and an outer perimeter, a first annular braking surface and a plurality of first mounting flanges positioned along the inner perimeter for affixing a corresponding portion of a rotor hat. Each flange may include an opening for receiving a fastener. The disc brake rotor ring may also include a second side parallel to and spaced apart from the first side thereby jointly defining a plurality of vents there-between, the second side including an inner perimeter and an outer perimeter, a second annular braking surface having and a plurality of second mounting flanges positioned on the inner perimeter of the for affixing a corresponding portion of a rotor hat. Each flange in the second side may also include an opening for receiving a fastener. Either the first side or the second side may be used as an outboard side when the brake rotor assembly is mounted on a wheel hub of a vehicle. In addition, the first mounting flanges may be alternately arranged and spaced apart from the second mounting flanges. The first mounting flanges and second mounting flanges are positioned in a central plane between the first side and the second side and the central plane is substantially parallel to the first side and the second side.

4 Claims, 10 Drawing Sheets

CENTER MOUNT TWO PIECE BRAKE ROTOR

FIELD OF THE PRESENT INVENTION

Embodiments of the present invention are directed toward novel brake rotor designs, and more particularly to universal brake rotors capable of being used on either side of a vehicle.

BACKGROUND OF THE INVENTION

Generally, existing brake rotors include solid, non-venting rotor designs and venting designs, as disclosed in U.S. Pat. No. 5,878,848 (vented). Accordingly, conventional ventilated brake rotors generally include a pair of mutually spaced-apart annular disks that present two opposed external braking surfaces for engaging brake pads under a clamping operation of a braking actuator (brake caliper). The space between the disks typically includes a number of vanes with flow passages defined between each pair of adjacent vanes that extend between the disks from their inner diameter to their outer diameter. Rotation of the rotor causes the vanes to induce air flow through the flow passages from the inner diameter to the outer diameter of the disks, providing increased convective heat transfer from the rotor. Inlets for the vanes reside adjacent the external braking surface of the base of the rotor.

All rotors include a "hat", which is used to mount and connect the brake disc to a wheel hub of a vehicle. In some disc brake rotor designs, the hat is integrally cast with the brake disc (rotor ring), and on other disc brake rotor designs, the hat is cast (or formed in some other method) separately, and then affixed to one side of the brake disc via fasteners, for example. However, such two piece brake rotor assemblies (i.e., a "hat" and "ring") are used typically with heavier duty (e.g., racing, truck) applications, rather than on typical passenger cars.

Problems with prior art vented, two piece brake rotors include airflow, and heat transfer/dissipation of the rotor, for example. Specifically, in the prior art one-piece or two piece vented rotors, a hat is attached to a single side (the outboard side) of the rotor. Thus, the hat not only connects the brake disc to the hub but also acts as a heat sink for only one side of the rotor, which tends to lead to an unbalanced heat load on the disc brake rotor assembly. Such imbalanced heat distribution may further lead to rotor warping problems. In that same regard, airflow for the prior art rotor (either the one-piece or two piece brake rotor designs) vent inlets is restricted to air obtained from only the inboard side of the rotor. Thus, airflow is more limited.

Other problems also include those requiring directional, vented, brake rotors. For example, some prior art vented, disc brake rotors are rotationally specific; meaning, the rotor includes directional vanes which necessitates that the rotor rotate in one direction (e.g., clockwise, counterclockwise), in order for the vanes to operate optimally and provide more efficient airflow. However, this poses a drawback: if directional rotors are required, such as for heavy duty or racing applications on a vehicle, two different rotors must be provided—one for either side of the vehicle. Thus, two sets of tooling for the two different disc brake rotor assemblies must be constructed, thereby increasing manufacturing and inventory costs.

SUMMARY OF THE INVENTION

The present invention addresses the above problems of the prior art and presents novel two-piece brake rotor designs and methods for cooling, venting, manufacturing and attachment of a hat to a brake disc. Accordingly, some embodiments of the present invention may increase brake performance and cooling efficiency of a disc brake rotor, as well as, for directional vane applications, allow a single disc brake rotor ring to be used for either side of a vehicle, for example. A disc brake rotor "assembly" as used to describe some embodiments of the present invention includes two-piece designs (separately cast hat and ring later assembled for mounting/connection to a wheel hub), and may also include other multi-piece designs.

Accordingly, in one aspect of the present invention, a disc brake ring for a two-piece brake rotor assembly may include a first side including an inner perimeter and an outer perimeter, a first annular braking surface and a plurality of first integral mounting portions positioned along the inner perimeter for affixing a corresponding portion of a brake rotor hat. The ring may also include a second side parallel to and spaced apart from the first side thereby jointly defining a plurality of vents there-between. The second side may also include an inner perimeter and an outer perimeter, a second annular braking surface having a plurality of second integral mounting portions positioned on the inner perimeter for affixing a corresponding portion of a rotor hat. Either the first side or the second side may be used as an outboard side when the assembly is mounted on a wheel hub of a vehicle.

In another aspect of the invention, a disc brake ring for a two-piece brake rotor assembly may include a first side including an inner perimeter and an outer perimeter, a first annular braking surface and a plurality of first mounting flanges positioned along the inner perimeter, for affixing a corresponding portion of a disc brake rotor hat, where each flange includes an opening for receiving a fastener. The disc brake ring in this aspect may also include a second side parallel to and spaced apart from the first side thereby jointly defining a plurality of vents there-between. The second side may include an inner perimeter and an outer perimeter, a second annular braking surface having and a plurality of second mounting flanges positioned on the inner perimeter of the for affixing a corresponding portion of a disc brake rotor hat. As with the first side, each flange may have an opening for receiving a fastener. Either the first side or the second side may be used as an outboard side when the disc brake rotor is mounted on a wheel hub of a vehicle. Moreover, in this aspect the first mounting flanges may be alternately arranged and spaced apart from the second mounting flanges and the first mounting flanges and second mounting flanges may be positioned in a central plane between the first side and the second side. The central plane may be substantially parallel to the first side and the second side. The present aspect may also be a directional rotor; the rotor to be operated generally in a single direction (e.g., forward).

Still another aspect of the present invention include a method of manufacturing a vented brake rotor capable of being used on either side of a vehicle. The method includes providing a disc brake rotor ring for a two-piece disc brake rotor assembly having a first side including an inner perimeter and an outer perimeter, a first annular braking surface, and a plurality of integral first mounting flanges positioned along the inner perimeter. Each flange may include an opening for receiving a fastener. The ring may also include a second side parallel to and spaced apart from the first side thereby jointly defining a plurality of vents there-between, the second side including an inner perimeter and an outer perimeter, a second annular braking surface having, and a plurality of integral second mounting flanges positioned on the inner perimeter, where each flange includes an opening for receiving a fastener. The method may also include positioning each flange of the plurality of first mounting flanges and each flange of the plurality of second mounting flanges within a central plane of the rotor. The central plane is preferably substantially parallel to the first side and the second side. The method may further include alternately arranging the first plurality of mounting flanges among the second plurality of mounting flanges.

In still yet another aspect of the invention, a method of cooling a two-piece vented brake rotor assembly capable of being used on either side of a vehicle may be provided. The two-pieces may include a disc brake rotor ring having two annular opposed braking surfaces and a disc brake rotor hat. The method may include providing a plurality of first openings on a first side of the two-piece rotor for allowing an airflow through the first openings and into a plurality of inlets provided on an inner diameter of the rotor and providing a plurality of second openings on a second side of the two-piece assembly for allowing an airflow through the second openings and into the plurality of inlets. Upon rotation of the rotor, the combined airflows flow between the first and second side and exit out a plurality of outlets positioned on the outer perimeter.

Other claim embodiments of the present invention may include a brake system and any vehicle, motorized or otherwise (e.g., automobile, trailer, plane, train, bus, truck, and the like), having one more brake rotors according to one or more of the above embodiments.

DETAILED DESCRIPTION OF THE EMBODIMENTS

As shown in FIGS. 1-5, a disc brake rotor assembly 100, for example, may include a rotor ring 101 and a rotor hat 106. The rotor ring may include a first side 102 having a annular braking surface 102a. Such a surface may include other features, including slots and openings for venting gasses and materials produced as a result of a braking pad coming into contact with the surface during use (see, for example, co-pending U.S. patent application Ser. No. 10/608,246, filed Jun. 27, 2003, the entire disclosure of which is herein incorporated by reference).

Figure 1A:
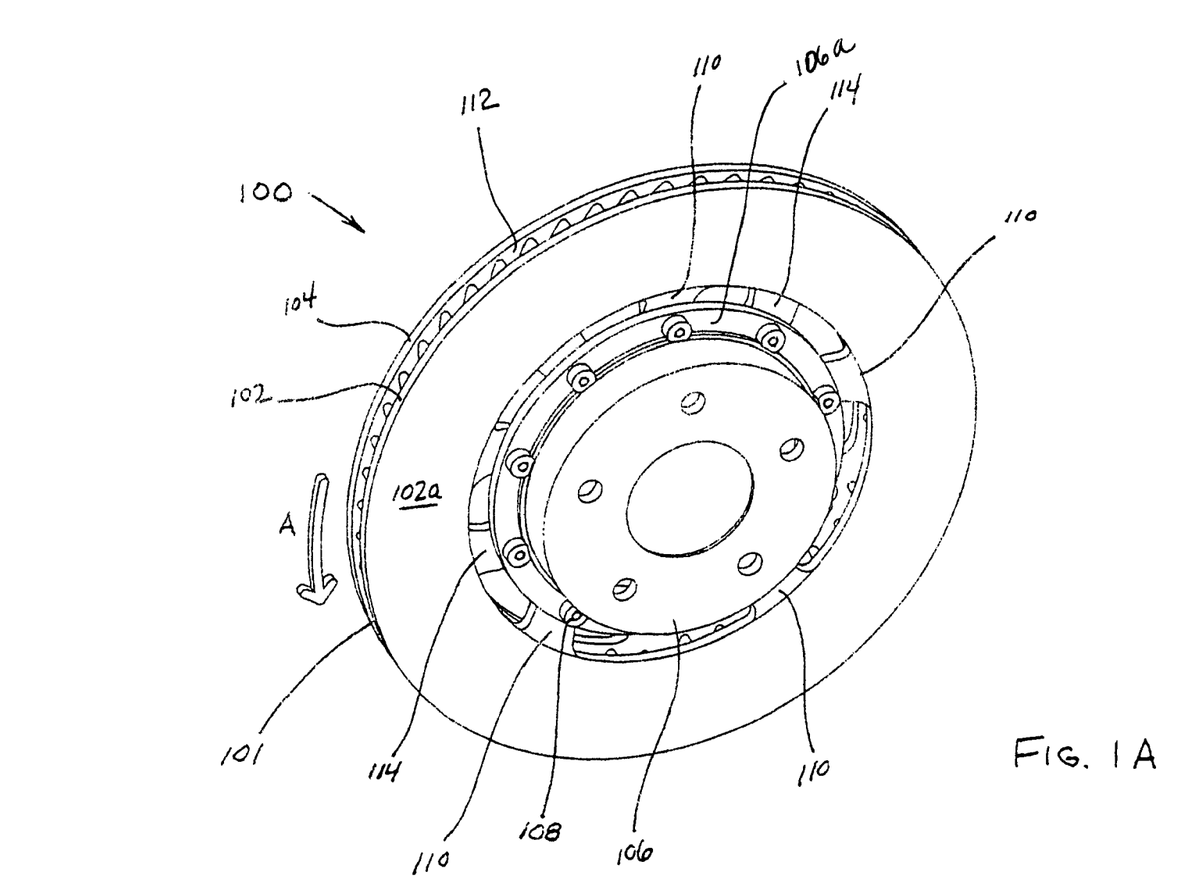
FIG. 1A is a perspective, front view of a brake rotor assembly according to an embodiment of the present invention, having a top mounted hat.
Figure 1B:
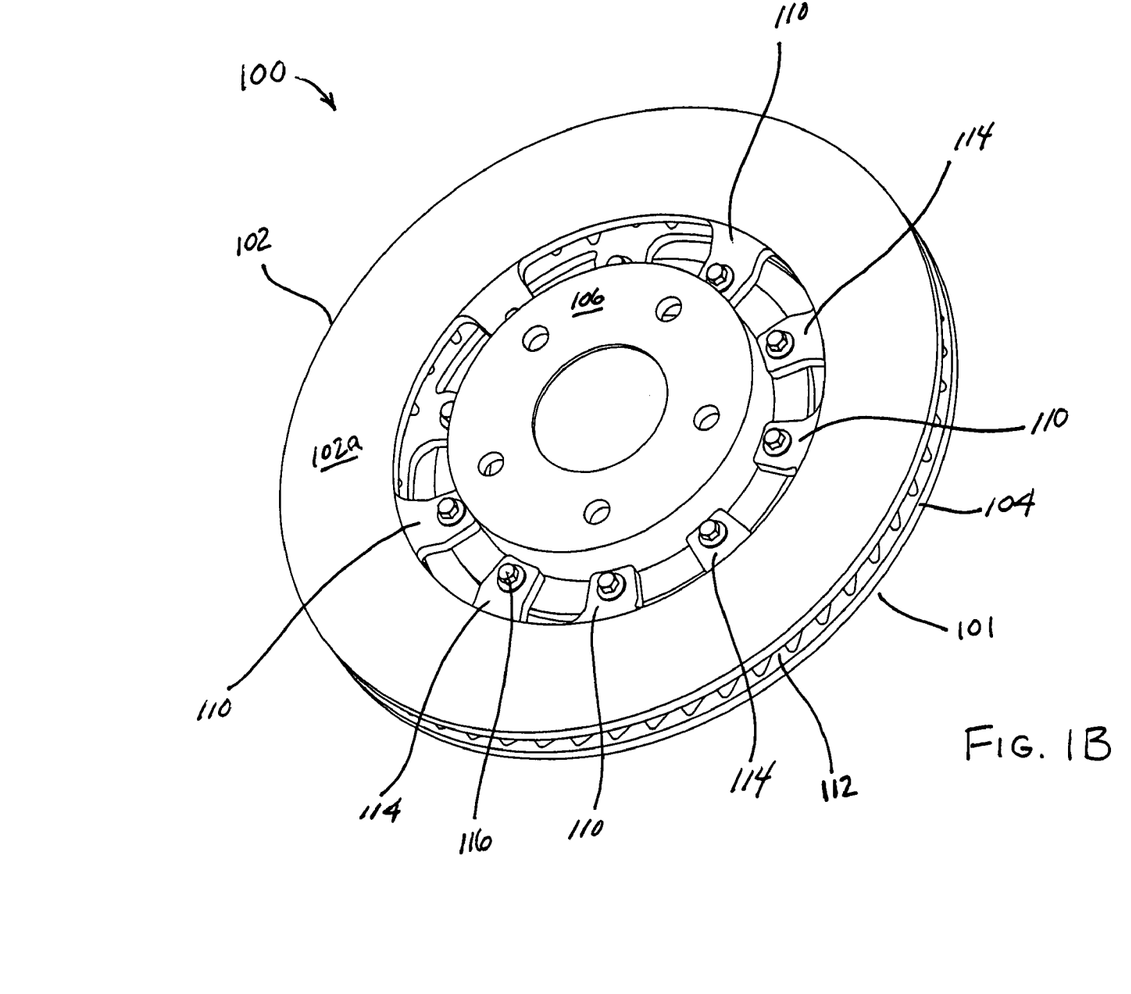
FIG. 1B is a perspective, front view of a brake rotor assembly according to an embodiment of the present invention, having a bottom mounted hat.
Figure 2A:
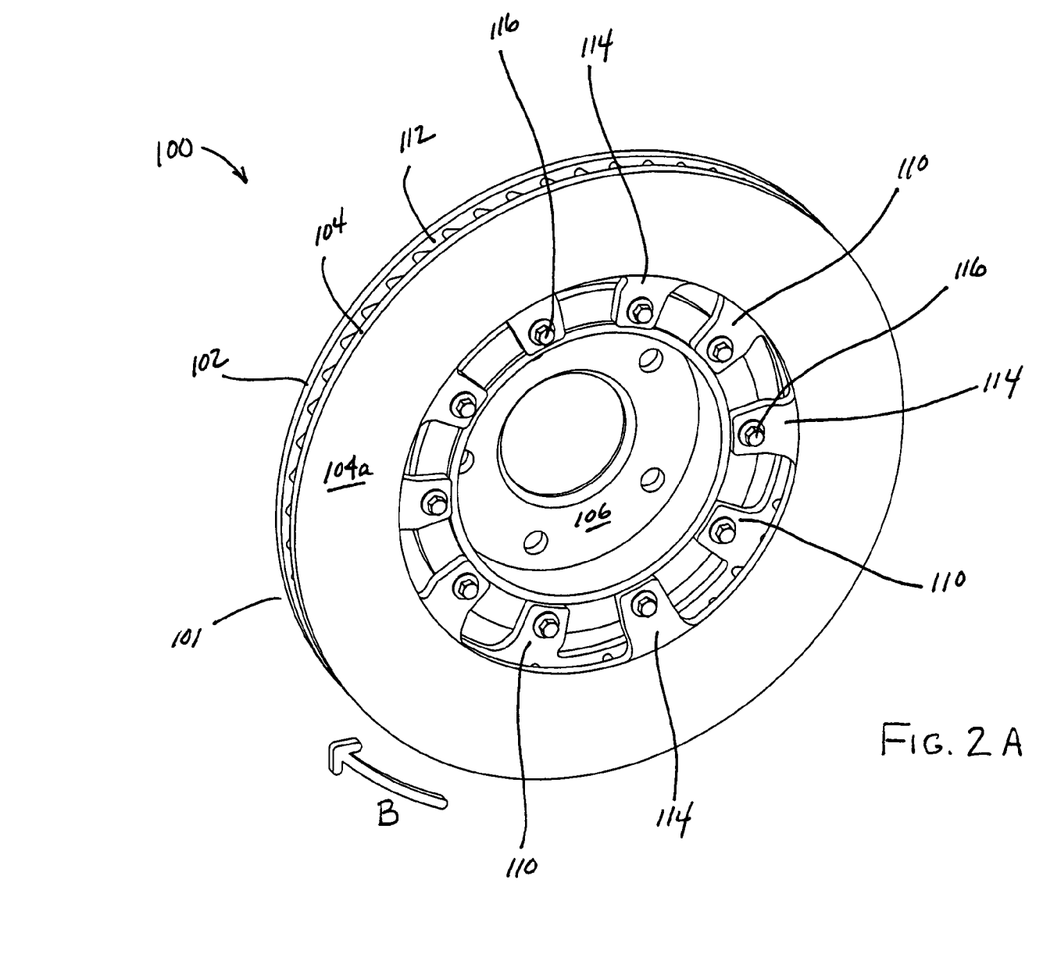
FIG. 2A is a perspective, rear view of the brake rotor assembly according to the embodiment of the present invention illustrated in FIG. 1A.
Figure 2B:
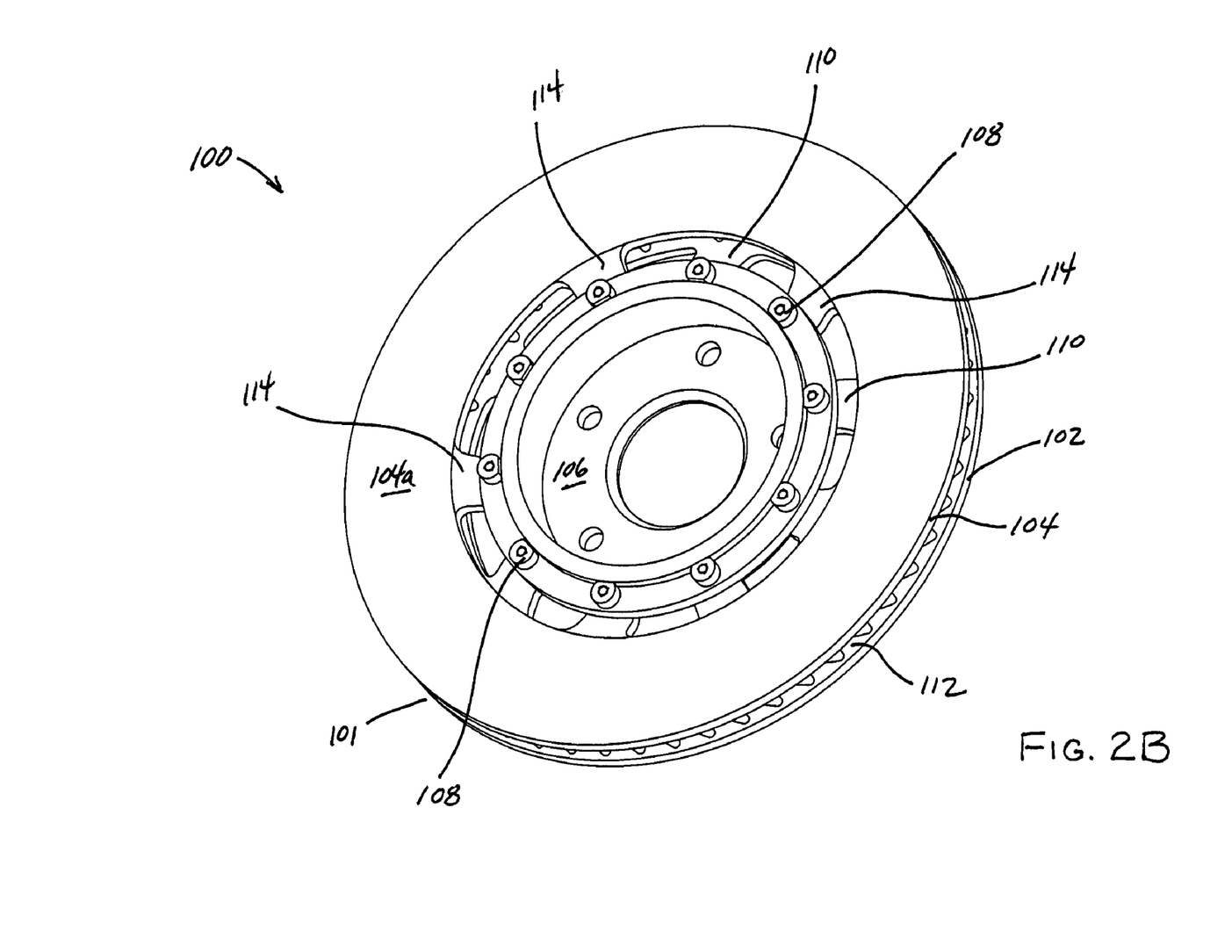
FIG. 2B is a perspective, rear view of the brake rotor assembly according to the embodiment of the present invention illustrated in FIG. 1B.

As shown in the figures, the rotor hat may be mounted from the "top"—e.g., the side of the rotor ring having annular braking surface 102a (see FIGS. 1A and 2A), or from the "bottom"—e.g., the of the rotor ring having annular braking surface 104a (see FIGS. 1B and 2B).

The first side 102 may also include a plurality of mounting portions 110 (e.g., flanges), each having an opening 110a, for receiving a fastener 108/116 for affixing a hat 106 to the rotor assembly 100.

As illustrated in FIG. 1A, rotor hat 106 has a radially extending flange 106a to which mounting portions 110 and 114 are attached.

The rotor ring may also include a second side 104, having a second annular braking surface 104a. As with the first side, other features may be included with this side and/or braking surface. The second side may also include a plurality of mounting portions 114 (e.g., flanges), each also including an opening 114a, for receiving the fastener 108/116 (threaded or otherwise) for affixing the hat 106.

Figure 3A:
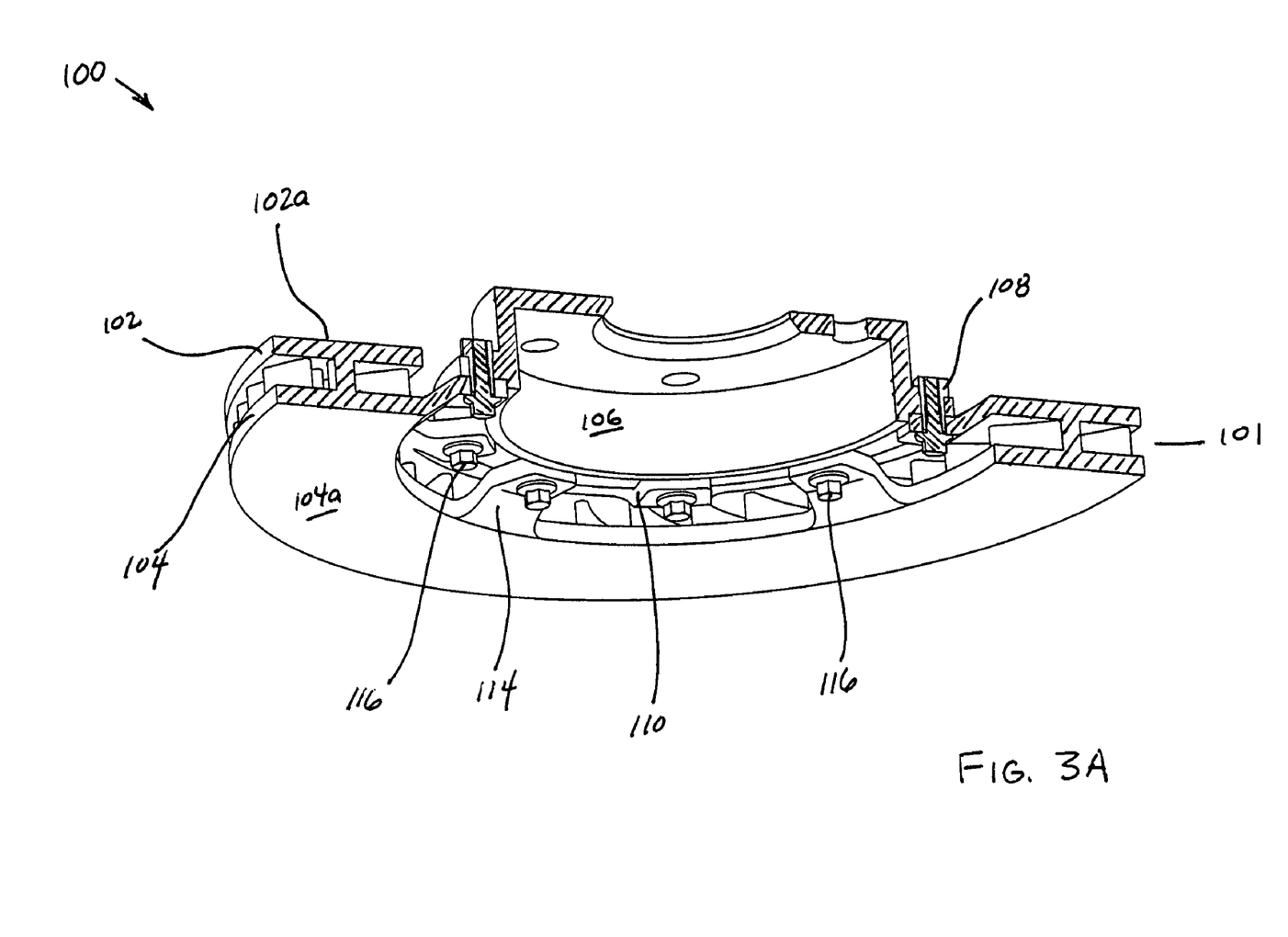
FIG. 3A is a perspective, sectional view of the brake rotor assembly according to the embodiment of the present invention illustrated in FIGS. 1A and 2A.
Figure 3B:
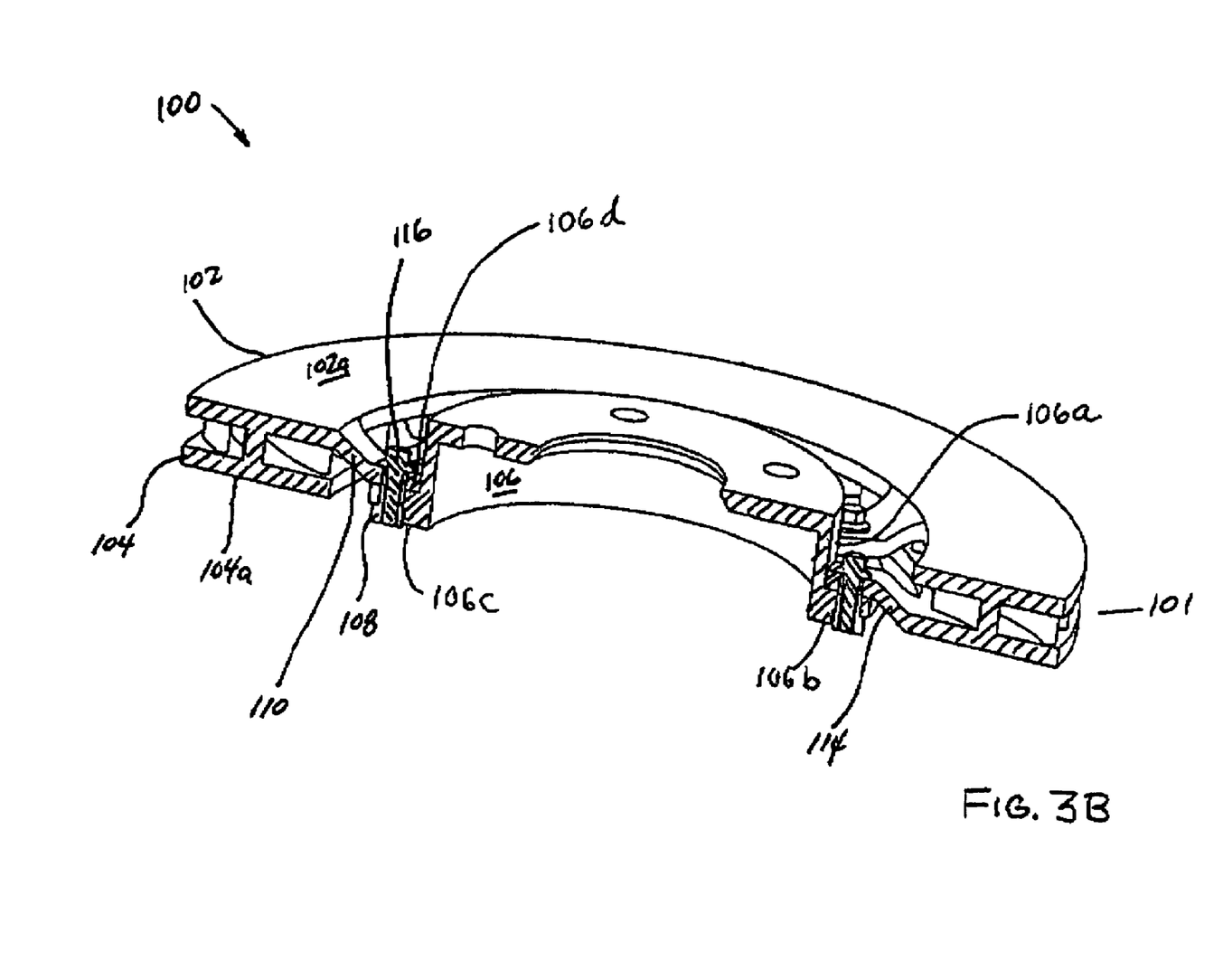
FIG. 3B is a perspective, sectional view of the brake rotor assembly according to the embodiment of the present invention illustrated in FIGS. 1B and 2B.
Figure 3C:
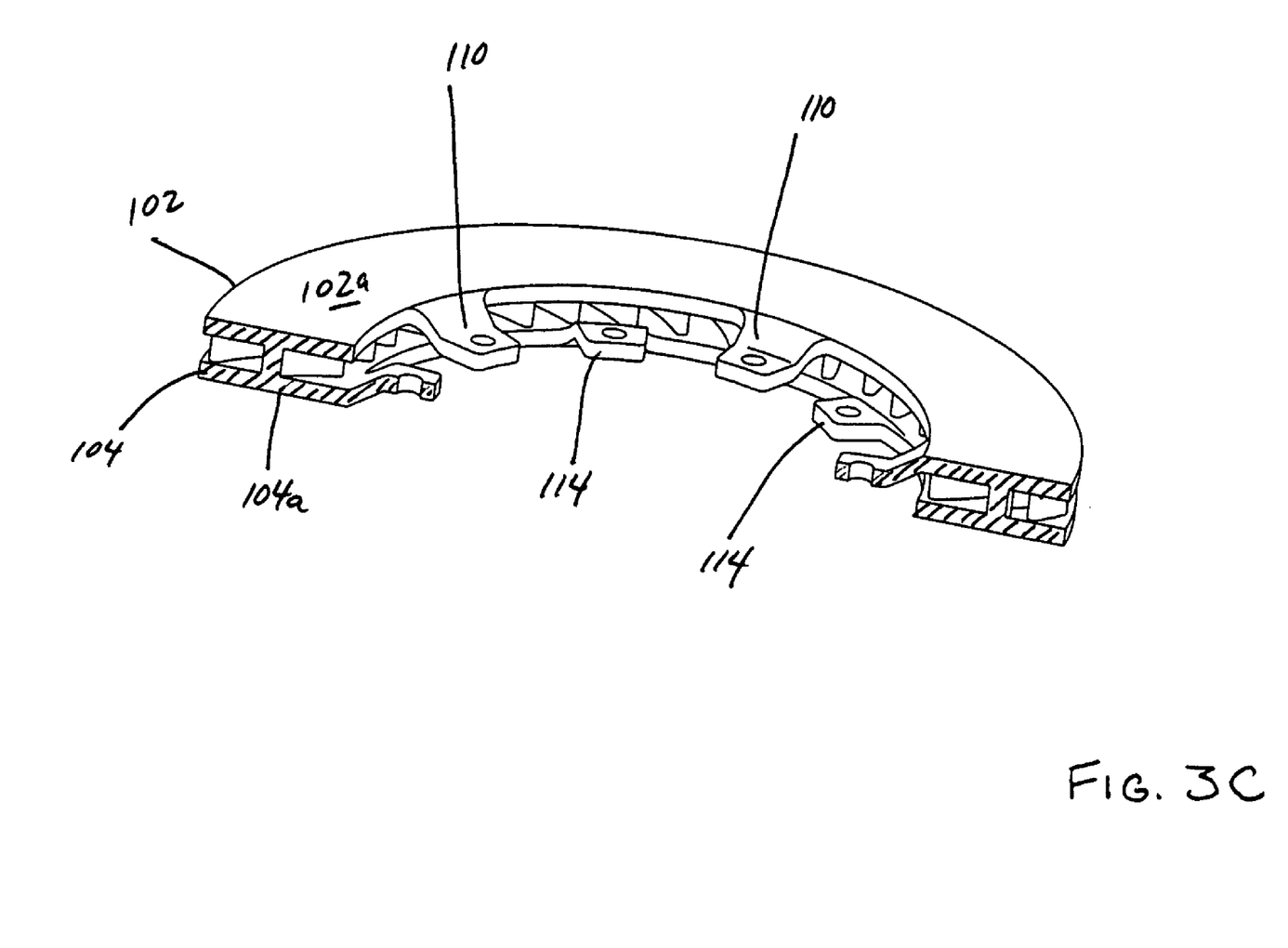
FIG. 3C is a perspective, sectional view of the disc brake rotor ring according to the embodiment of the present invention illustrated in FIGS. 1 and 2, without a rotor hat.

As best illustrated in FIG. 3B, rotor hat 106 comprises a circular wall 106a, an annular flange portion 106b, the flange portion 106b having an outer face 106c and an inner face 106d.

Figure 4A:
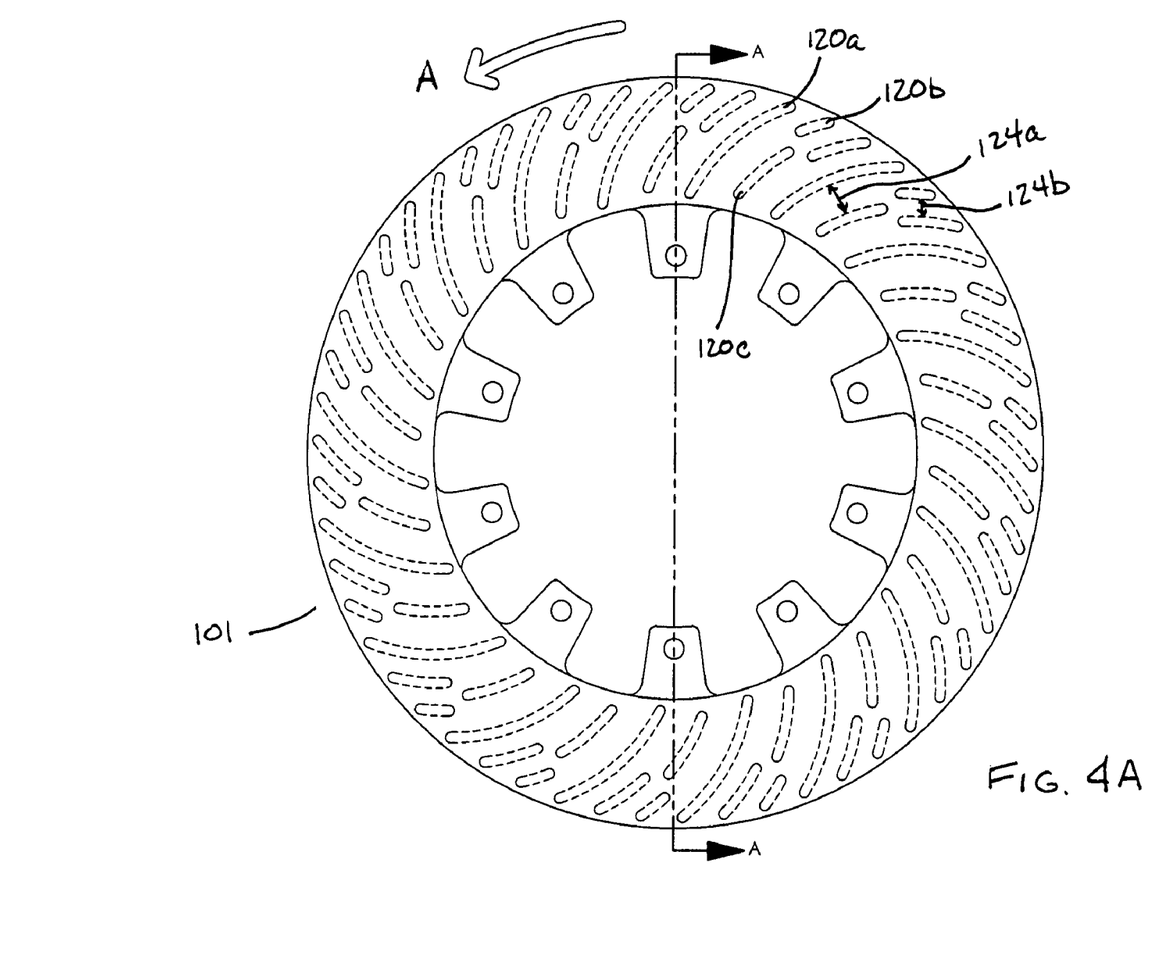
FIG. 4A is front view of a disc brake rotor ring according to an embodiment of the invention, having dashed (hidden) lines to represent a plurality of vanes for internal vents of the rotor ring according to an embodiment of the present invention.
Figure 4B:
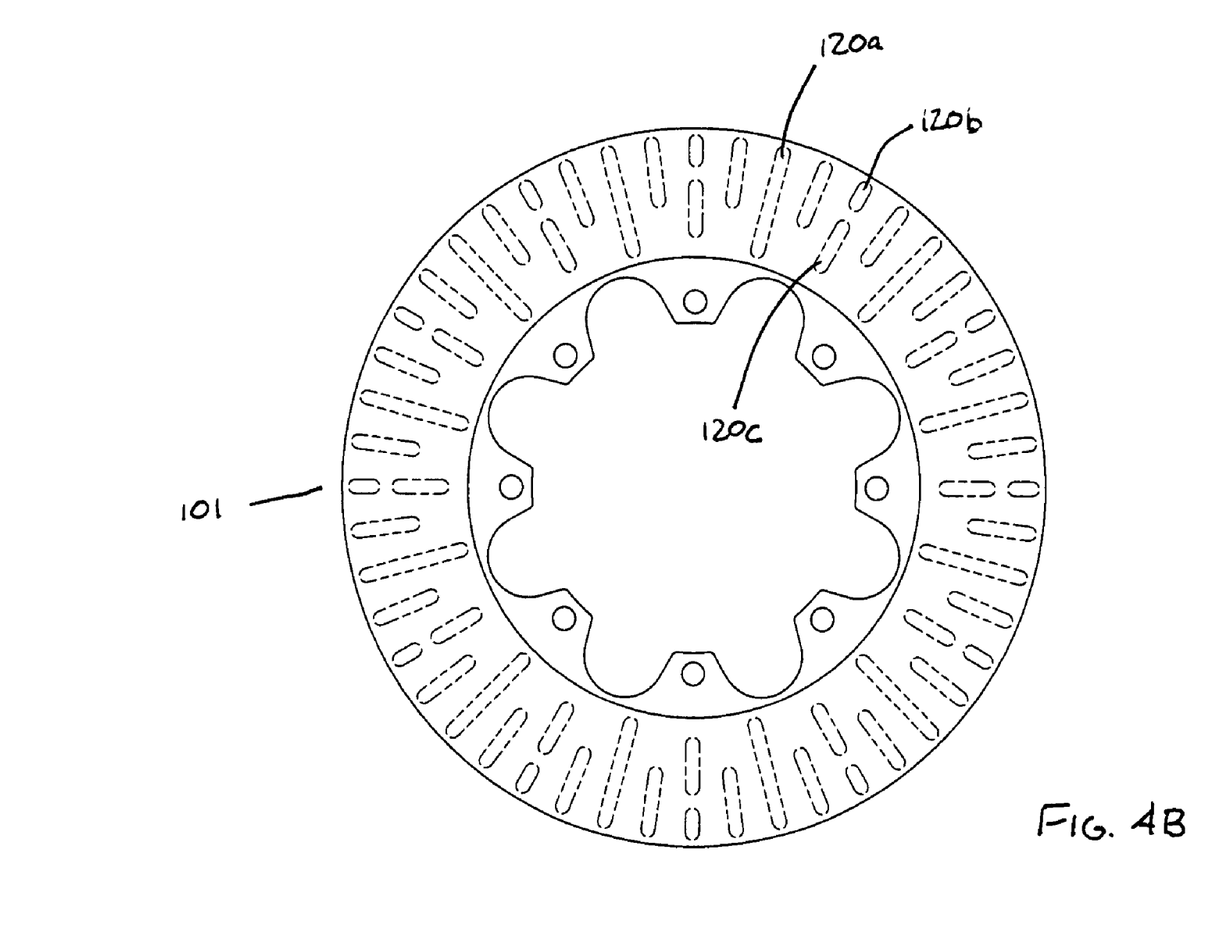
FIG. 4B is front view of a brake rotor according to an embodiment of the invention, having dashed (hidden) lines to represent a plurality of vanes for internal vents of a disc brake rotor ring according to another embodiment of the present invention.

The first and second side are preferably spaced apart from one another via a plurality of walls/vanes, which may include various sizes 120a, 120b, and 120c. The vanes establish a plurality of vent/flow passages, which may include various sizes 124a and 124b. The walls may comprise different sizes: e.g., they may be all uniformly sized, or they may include different size walls throughout (as illustrated—see FIG. 4).

As shown in the figures, the walls of the vent passages may be curved (see FIG. 4A), so that upon rotation of the brake rotor ring in the counterclockwise direction A (as viewed from the front of the rotor ring; direction B as viewed from the back of the rotor ring), the walls perform like the vanes of a pump (or fan), moving air into inlets 118, and out of outlets 112. Thus, as the air moves throughout the passages, it collects heat generated by the rotor ring from braking, thereby providing cooling, (i.e., increases connective heat transfer). This may reduce the heatload on the hat. However, the present invention is not limited to vent passages having curved walls as illustrated for some embodiments of the present invention. Some embodiments of the present invention may include vent passages having straight walls (see FIG. 4B), angular walls, non-contiguous walls, and any combination thereof.

Figure 5:
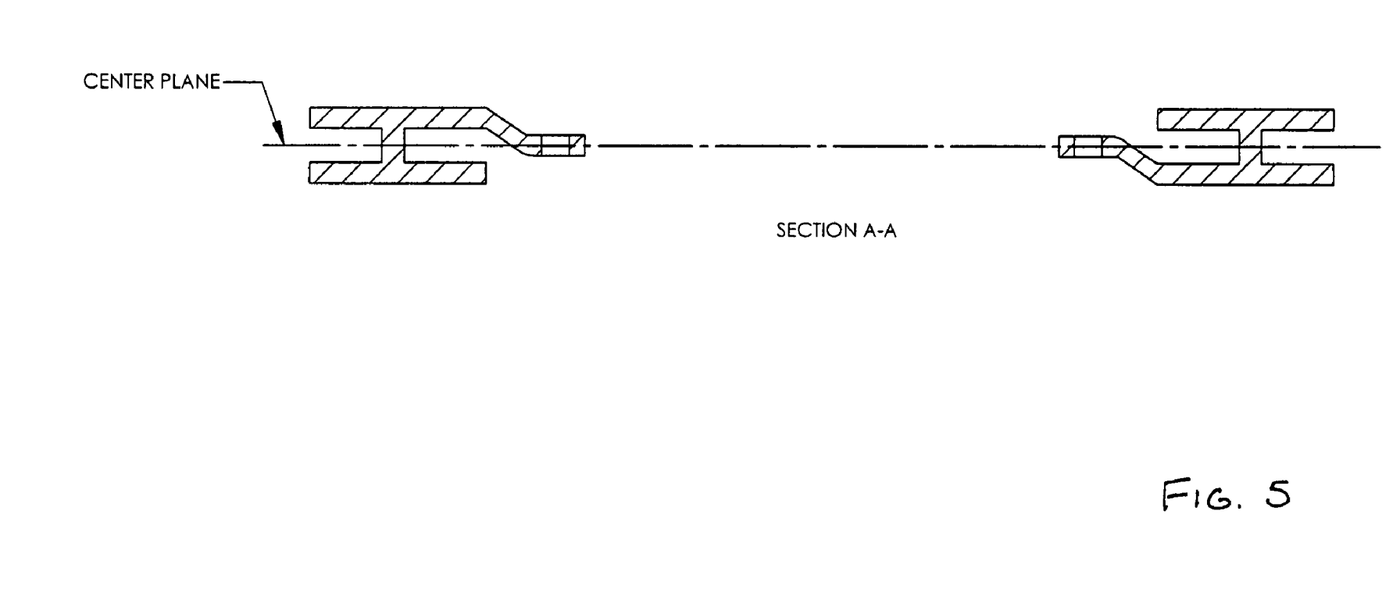
FIG. 5 is a side, A-A sectional view of the disc brake rotor ring according to the embodiment of the present invention illustrated in FIG. 4A.

In some embodiments, as can be seen in one or more of the figures, each of the mounting portions may be formed in an angled arrangement such that an area of the flange for contacting the hat is positioned in a central plane 122 between the first side and the second side (see FIG. 5). In one particular embodiment, the central plane is positioned preferably midway between the two braking surfaces of the rotor ring (i.e., the center). Moreover, this central plane is preferably parallel to the first and second sides.

As shown, in some embodiments of the invention, the flanges are alternately positioned around an inner perimeter of each corresponding side. Thus, a flange from one side of the rotor ring may be flanked on either side by a flange from the other side of the rotor ring. This is preferable since the stress generated during braking from both sides may then be evenly spread to the hat via the alternating flanges. Thus, the flanges perform as "spokes" in supporting and affixing the rotor ring to the hat. Also, the spoked/alternating arrangement may evenly slow down the heat transferred from both sides of the rotor ring to the rotor hat which reduces stress load to the hat. Thus, with such an arrangement, the rotor ring is less likely to warp. Although the illustrated embodiments include alternately arranged single flanges (as opposed to direct mount to one single side of the rotor ring) from each side of the rotor ring (e.g., every other flange is from one side), other arrangements are within the scope of the invention (e.g., alternating two, three flange arrangement and the like). Moreover, although a total of ten (10) flanges are illustrated (e.g., five from each side), one of skill in the art will appreciate that fewer or more flanges (from one or both sides) may be used in different arrangements.

The alternating/spoked arrangements of the mounting portions/flanges also allow air to freely enter the inlets 118 from both sides (e.g., the inboard and the outboard side) of the rotor ring. In contrast, prior art disc brake rotor assemblies (especially two-piece designs), in which a hat is attached to one side of the rotor ring, which limit airflow to air received from the inboard side of the rotor ring only.

Having now described some of the embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention. The contents of any references cited throughout this application are hereby incorporated by reference. The appropriate components, processes, and methods of those documents may be selected for the present invention and embodiments thereof.

What is claimed is:

1. A disc brake rotor ring for a disc brake rotor assembly, comprising:

a first side including an inner perimeter and an outer perimeter, a first annular braking surface and a plurality of first integral, spaced mounting portions positioned along and extending inwardly from the inner perimeter for affixing a corresponding radially extending flange portion of a disc brake rotor hat extending out from one side of said disc brake rotor ring;

a second side parallel to and spaced apart from the first side thereby jointly defining a plurality of vents there-between, the second side including an inner perimeter and an outer perimeter, a second annular braking surface having a plurality of second integral, spaced mounting portions positioned on and extending inwardly from the inner perimeter of the second side for affixing a corresponding radially extending flange portion of said disc brake rotor hat, said brake rotor hat having a circular wall partially closed at one end and an annular flange surrounding the circular wall between a fully open end of said brake rotor hat and the partially closed end, said annular flange having an outer face side on the same side as the fully open end and an inner face side opposite the outer face side;

said disc brake rotor hat being mounted directly on both of said first and second side spaced mounting portions with said mounting portions from said first and second sides alternating in being connected to the inner face side of said flange portion of said disc brake rotor hat, said inner face side being substantially parallel to the first and second sides of said disc brake rotor ring; and a plurality of threaded fasteners attaching said flange of the hat to the first and second mounting portions with said circular wall of said hat passing through the inner perimeters of said first and second sides;

wherein either the first side or the second side may be used as an outboard side when the disc brake rotor assembly is mounted on a wheel hub of a vehicle.

2. The disc brake rotor ring according to claim 1, wherein each of said first mounting portions and each of said second mounting portions comprises a flange positioned in a central plane between the first side and the second side, and wherein the central plane is substantially parallel to the first side and the second side.

3. The disc brake rotor ring according to claim 2, wherein the first and second mounting portion flanges are in a plane between the respective braking surfaces.

4. The disc brake rotor ring according to claim 1, wherein the ring is rotation specific.

* * * * *